(12) United States Patent
Ogue et al.

(10) Patent No.: US 9,840,211 B2
(45) Date of Patent: Dec. 12, 2017

(54) WIRE HARNESS

(71) Applicant: YAZAKI CORPORATION, Tokyo (JP)

(72) Inventors: Takeshi Ogue, Shizuoka (JP); Hideomi Adachi, Shizuoka (JP); Shinichi Inao, Shizuoka (JP); Tatsuya Oga, Shizuoka (JP); Hiroyuki Yoshida, Shizuoka (JP); Masaaki Suguro, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/845,585

(22) Filed: Sep. 4, 2015

(65) Prior Publication Data

US 2015/0375696 A1  Dec. 31, 2015

Related U.S. Application Data

(63) Continuation of application No. PCT/JP2014/055757, filed on Mar. 6, 2014.

(30) Foreign Application Priority Data

Mar. 6, 2013 (JP) ................................. 2013-043653

(51) Int. Cl.
    *B60R 16/02* (2006.01)
    *H02G 3/04* (2006.01)

(52) U.S. Cl.
    CPC ....... *B60R 16/0215* (2013.01); *H02G 3/0468* (2013.01); *H02G 3/0487* (2013.01); *H02G 3/0462* (2013.01)

(58) Field of Classification Search
    CPC combination set(s) only.
    See application file for complete search history.

(56) References Cited

U.S. PATENT DOCUMENTS

| 5,661,453 A * | 8/1997 | Justus ................. B60R 16/0215 |
| | | 340/438 |
| 9,302,635 B2 * | 4/2016 | Han .................... B60R 16/0222 |
| 2005/0011687 A1 | 1/2005 | Yamaguchi et al. |

FOREIGN PATENT DOCUMENTS

| JP | 58-72925 U | 5/1983 |
| JP | 68-72925 U | 5/1983 |
| JP | 2004-224156 A | 8/2004 |
| JP | 2007-312472 A | 11/2007 |
| JP | 2009-143326 A | 7/2009 |

(Continued)

OTHER PUBLICATIONS

International Search Report and Written Opinion of the International Search Report for PCT/JP2014/055757 dated Apr. 8, 2014.

(Continued)

*Primary Examiner* — Dhirubhai R Patel
(74) *Attorney, Agent, or Firm* — Kenealy Vaidya LLP

(57) ABSTRACT

A wire harness includes an electrical pathway and a pipe like exterior member that covers the electrical pathway. The exterior member includes a low rigidity portion which is flexible and a high rigidity portion which is unflexible and has a rigidity higher than the low rigidity portion, and the low rigidity portion and the high rigidity portion are successively arranged in an extending direction of the electrical pathway.

11 Claims, 6 Drawing Sheets

(56) References Cited

FOREIGN PATENT DOCUMENTS

JP 2009-290916 A 12/2009

OTHER PUBLICATIONS

International Preliminary Report on Patentability and English language Written Opinion of the International Search Report for PCT/JP2014/055757.
Japanese Office Action for the related Japanese Patent Application No. 2013-043653 dated May 9, 2017.
Japanese Office Action for the related Japanese Patent Application No. 2013-043653 dated Feb. 28, 2017.

* cited by examiner

WIRE HARNESS

CROSS REFERENCE TO RELATED APPLICATIONS

This application is a continuation of PCT application No. PCT/JP2014/055757, which was filed on Mar. 6, 2014 based on Japanese Patent Application (No. 2013-043653) filed on Mar. 6, 2013, the contents of which are incorporated herein by reference.

BACKGROUND OF THE INVENTION

1. Technical Field

The present invention relates to a wire harness that includes a pipe-like exterior member, and one or a plurality of electrical pathways that are inserted through the exterior member.

2. Related Art

Wire harnesses are used as members that are electrically connected between high voltage devices in a hybrid vehicle or an electric vehicle.

A wire harness disclosed in JP-A-2004-224156 includes a plurality of high voltage electric wires (electrical pathways) and a plurality of metal pipes which accommodates the high voltage electric wires respectively. The wire harness is a long member that extends from the front portion of the vehicle toward the back portion, and is wired along a predetermined course.

The wire harness is manufactured by inserting a predetermined number of (three, in JP-A-2004-224156) high voltage electric wires through metal pipes which are in a straight state, and bending the metal pipes into a shape in accordance with the above predetermined course, namely, a three-dimensional shape. Then, after the manufacture, the wire harness is transported to the vehicle where the wire harness is wired while the three-dimensional shape is kept.

SUMMARY

In the above traditional art, an operation of inserting the high voltage electric wires to slide on the inner surfaces of the metal pipes is performed. At this time, there is a problem which is that if the sliding frictional resistance is large, the operatively of the inserting may decrease.

The present invention is made in view of the above situations, and the object of the present invention is to provide a wire harness so that the operatively when electrical pathways are inserted through an exterior member can be improved.

In the present invention to solve the above problem, a wire harness includes a pipe-like exterior member and one or a plurality of electrical pathways that are inserted through the exterior member, and the exterior member has a straight part, and an inner face of the straight part is formed with recesses, which become contactless with the electrical pathways when the electrical pathways are inserted.

According to the present invention having the above features, when the electrical pathways are inserted through the exterior member, the electrical pathways pass the recesses formed on the inner surface of the straight part of the exterior member. Because the sliding area of the electrical pathways and the inner surface is reduced when the electrical pathways pass the recesses, the present invention can reduce the sliding frictional resistance that acts on the electrical pathways in comparison with the exterior member which does not have the recesses.

Also, in the present invention, curved surfaces or tapers are formed at edges of the recesses in the above-described wire harness.

According to the present invention having the above features, because the edges of the recesses are formed with the curved surfaces or tapers, the electrical pathways are hard to be caught by the recesses. Therefore, the electrical pathways can be inserted through the exterior member smoothly.

Also, in the present invention, the electrical pathways are formed to have a length to pass though a vehicle floor and extend across the vehicle floor, and the exterior member is also formed to have a length to pass though the vehicle floor and extend across the vehicle floor, in the above-described wire harness.

According to the present invention having the above features, the wire harness is a long one whose electrical pathways have a long insertion distance, and when the present invention is adopted in the long wire harness, the operatively concerning the manufacture of the wire harness can be improved.

According to the present invention, an effect is achieved that the operatively when electrical pathways are inserted through an exterior member can be improved.

DETAILED DESCRIPTION OF EMBODIMENTS

A wire harness includes a pipe-like exterior member whose inner surface is formed with recesses, and one or a plurality of electrical pathways which are inserted through the exterior member. Curved surfaces or tapers are formed at edges of the recesses.

Figure 1:
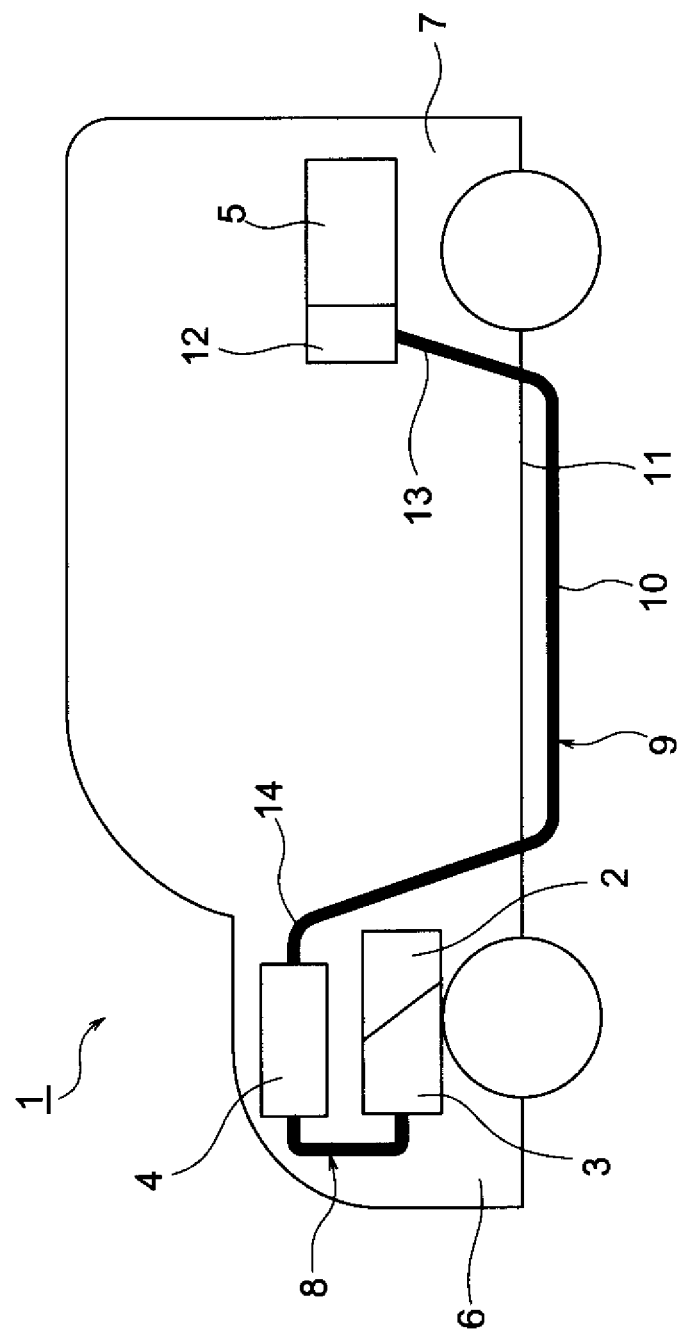
FIG. 1 is a schematic view which indicates that a wire harness of an embodiment of the present invention is wired.
Figure 2:
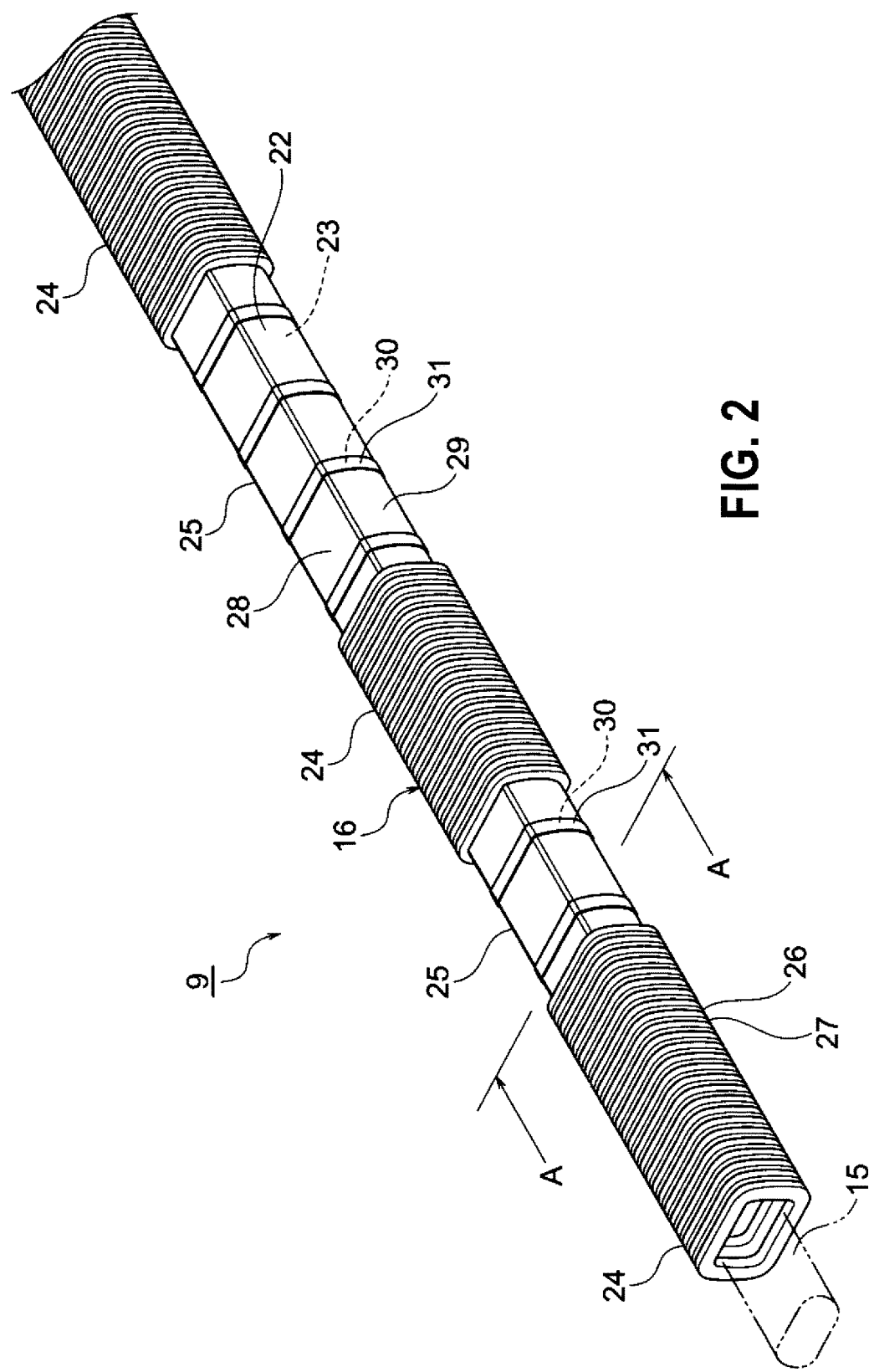
FIG. 2 is a perspective view of the wire harness of the embodiment of the present invention.
Figure 3:
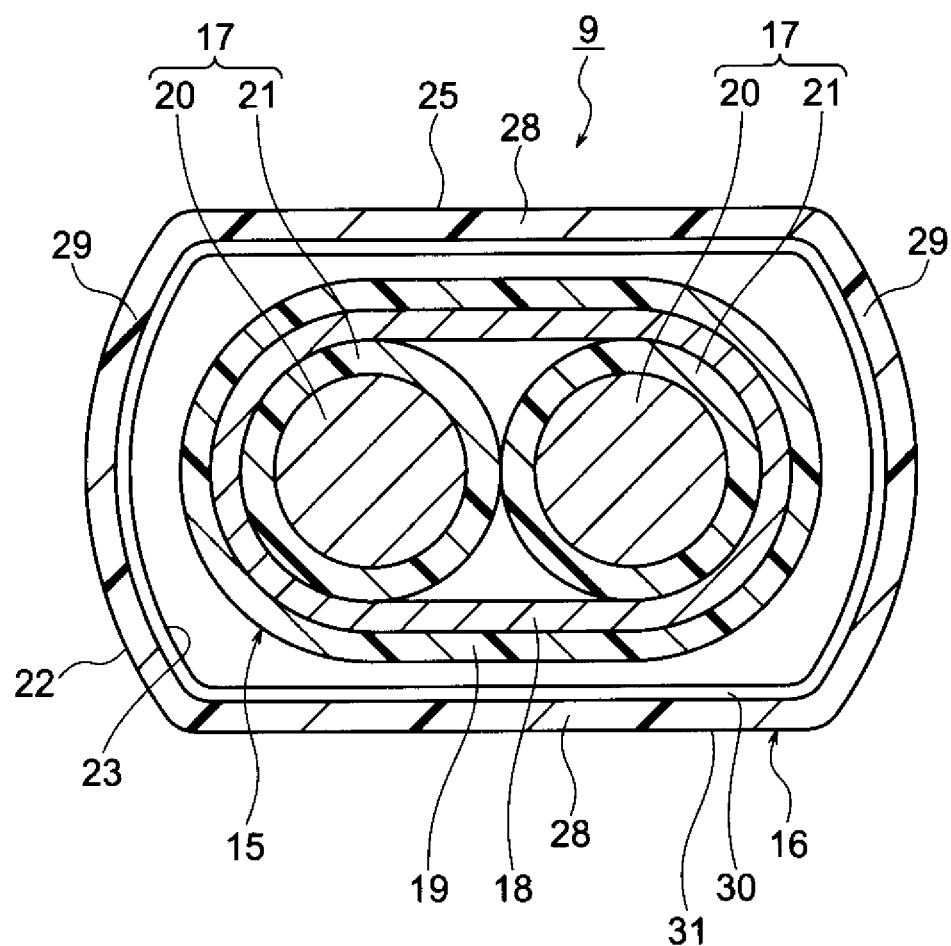
FIG. 3 is an A-A line sectional view of FIG. 2.
Figure 4:
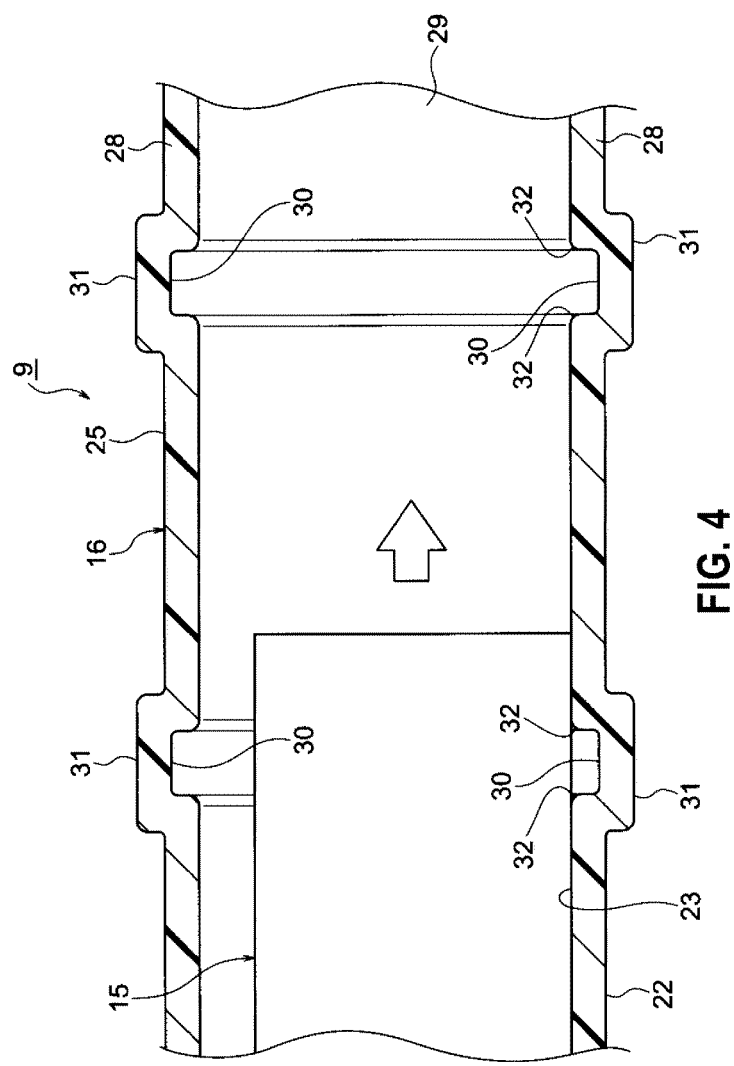
FIG. 4 is a sectional view when an electrical pathway is inserted in the wire harness of the embodiment of the present invention.
Figure 5:
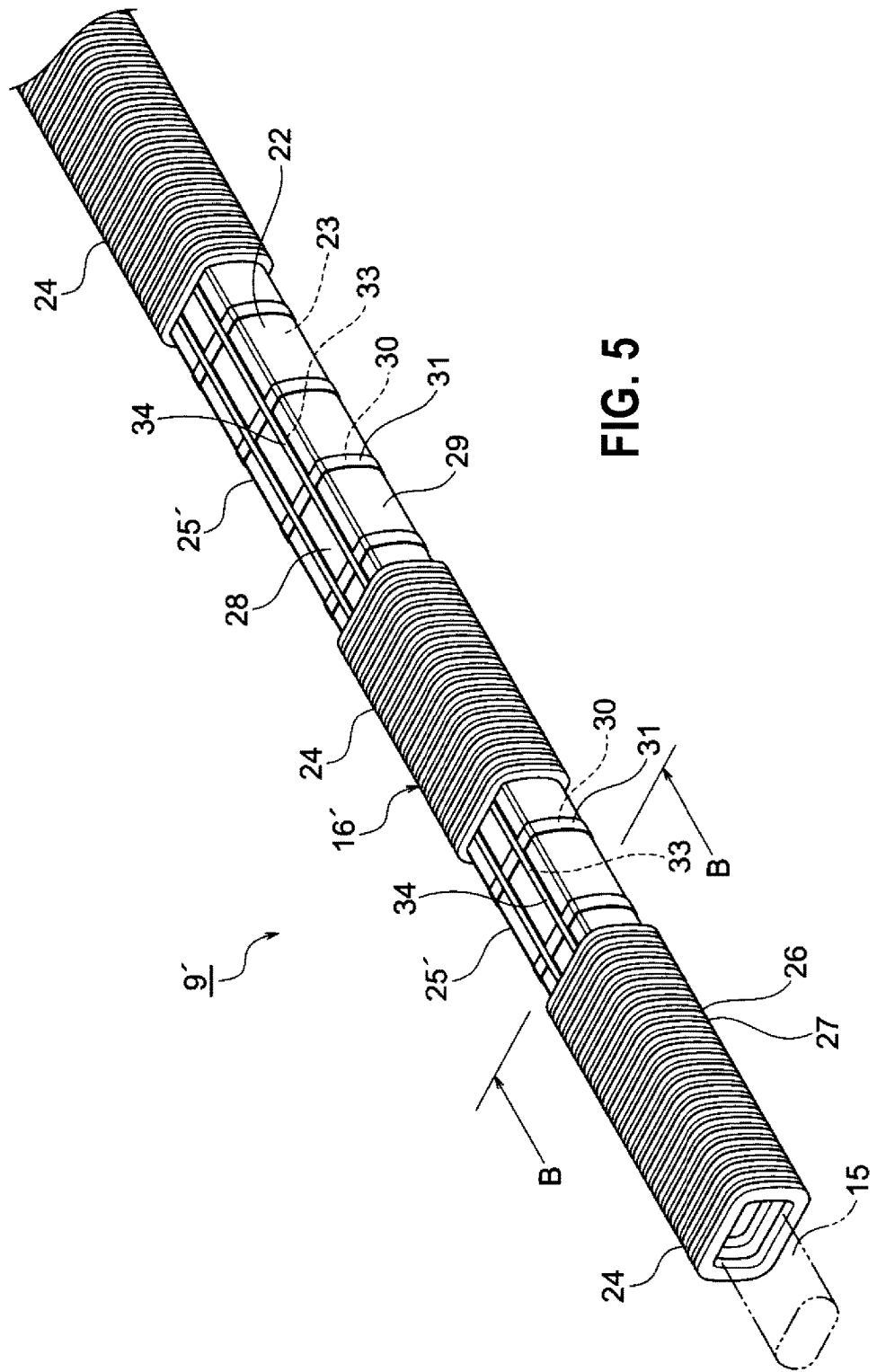
FIG. 5 is a perspective view of a wire harness as a variation of the embodiment of the present invention.
Figure 6:
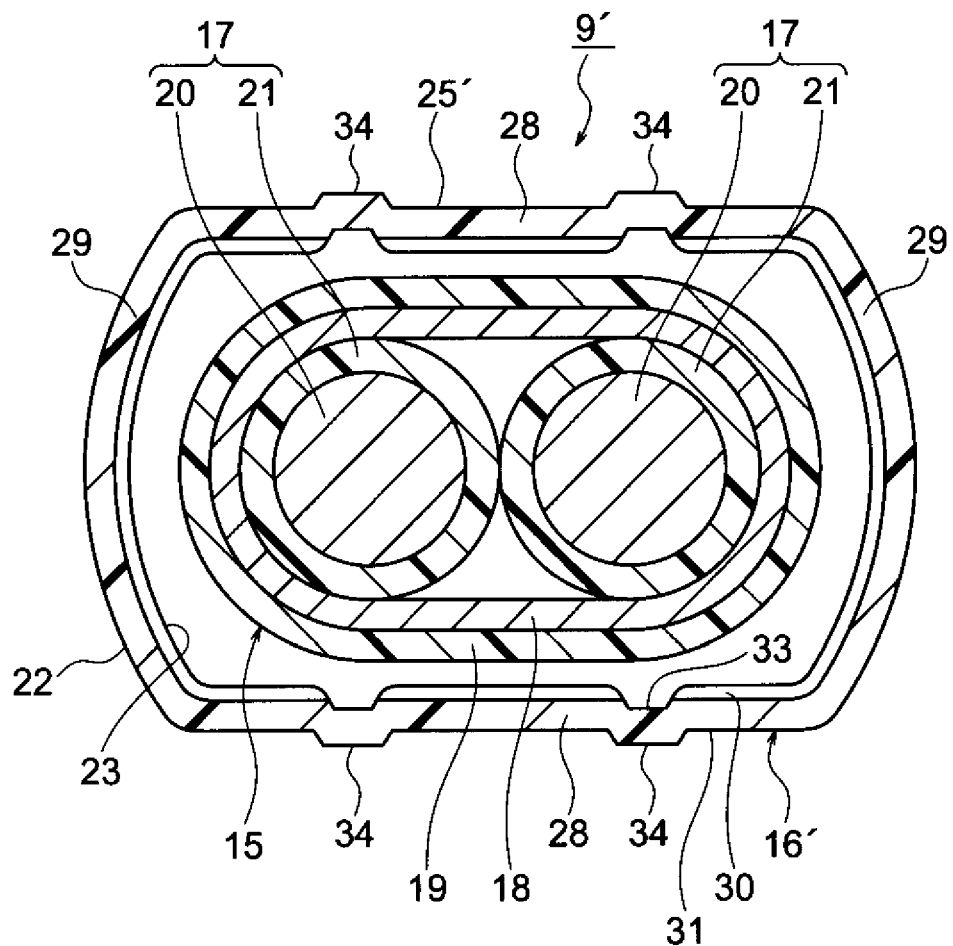
FIG. 6 is a B-B line sectional view of FIG. 5.

Below, embodiments will be described with reference to the figures. FIG. 1 is a schematic view which indicates that a wire harness of the present invention is wired. FIG. 2 is a perspective view of the wire harness of an embodiment of the present invention. FIG. 3 is an A-A line sectional view of FIG. 2. FIG. 4 is a sectional view when an electrical pathway is inserted in the wire harness of the embodiment of the present invention. FIG. 5 is a perspective view of a wire harness as a variation of the embodiment of the present invention. FIG. 6 is a B-B line sectional view of FIG. 5.

In the present embodiment, the present invention is applied to a wire harness which is wired in a hybrid vehicle (or an electric vehicle or a general vehicle).

In FIG. 1, a reference sign 1 indicates a hybrid vehicle. The hybrid vehicle 1 is a vehicle which is driven by mixing two powers of an engine 2 and a motor unit 3, and the electric power from a battery 5 (battery pack) will be supplied to the motor unit 3 via an inverter unit 4. The engine 2, the motor unit 3 and the inverter unit 4 are carried in an engine room 6 at the position of front wheels and the like in the embodiment. The battery 5 is carried in a vehicle back part 7 of back wheels and the like (it is also possible that the battery 5 is carried in a vehicle indoor room which is behind an engine room 6).

The motor unit 3 and the inverter unit 4 are connected by a high voltage wire harness 8. The battery 5 and the inverter unit 4 are also connected by a high voltage wire harness 9. A middle part 10 of the wire harness 9 is wired below a vehicle floor 11. The middle part 10 is wired substantially in parallel with the vehicle floor 11. The vehicle floor 11 is a well-known body and is a so-called panel member, and through holes are formed at predetermined positions. The wire harness 9 is inserted through these through holes watertightly. A back end 13 side and a front end 14 side of the wire harness 9 which are located to sandwich the middle part 10 can enter into the vehicle and becomes above the floor of the vehicle when the wire harness 9 is inserted through the through holes of the vehicle floor 11.

The wire harness 9 and the battery 5 are connected through a junction block 12 which the battery 5 is provided with. The back end 13 of the wire harness 9 is electrically connected to the junction block 12 with a well-known method. The front end 14 of the wire harness 9 is electrically connected to the inverter unit 4 with a well-known method.

The motor unit 3 includes a motor and a generator in structure. The inverter unit 4 includes an inverter and a converter in structure. The motor unit 3 is formed as a motor assembly including a shielding case. The inverter unit 4 is also formed as an inverter assembly including a shielding case. The battery 5 is a Ni-MH battery or Li-ion battery, and is modulated. Further, for example, an electric power storage device such as a capacitor may be used. The battery 5 shall not be particularly limited as long as the battery 5 may be used for the hybrid vehicle 1 or an electric vehicle.

In FIG. 2, the wire harness 9 includes a high voltage electrical pathway 15 (electrical pathway), an exterior member 16 which accommodates and protects the high voltage electrical pathway 15, shielded connectors (not shown) which are provided at the ends the high voltage electrical pathway 15, and a plurality of clamps (not shown), grommets or the like which are attached on the outer surface of the exterior member 16.

The wire harness 9 may have such a constitution and structure that the exterior member 16 accommodates and protects low voltage electrical pathways as well as the high voltage electrical pathway 15.

The high voltage electrical pathway 15 includes two high voltage circuits 17, a shielding member 18 which covers the two high voltage circuits 17, and a sheath 19 which is provided on the outside of the shielding member 18. The high voltage electrical pathway 15 described in the present embodiment is just one example, and the present invention is not limited by the constitution and structure of the high voltage electrical pathway 15.

The high voltage circuit 17 is a well-known high voltage electric wire here, and includes a conductor 20 and an insulator 21 which coats the conductor 20. The high voltage circuit 17 is formed to have a length necessary to electrically connect devices. Because the wire harness 9 electrically connects the inverter unit 4 and the battery 5 (junction block 12) (refer to FIG. 1), the high voltage circuit 17 is formed into a long one. Specifically, the high voltage circuit 17 is formed to have a length to extend across the vehicle floor 11 (refer to FIG. 1), in other words, a length equal to or more than a course binding two through holes which the vehicle floor 11 is provided with and through which the wire harness penetrates.

The conductor 20 is manufactured of copper, copper alloy, aluminum or aluminum alloy. The conductor 20 may be either a conductor structure in which strands are twisted or a rod-like conductor structure whose cross section is a rectangular shape or a round shape (for example, a conductor structure with a rectangular single core or a round single core, and in this case, the electric wire itself becomes rod-like). The insulator 21 made of insulative resin is extruded onto the outer surface of the above conductor 20.

Although well-known high voltage electric wires are adopted as the high voltage circuit 17 in the present embodiment, the present invention is not limited to this. That is, it is also possible to provide an insulator to a well-known bus bar to be used as the high voltage circuit.

The shielding member 18 is an electromagnetic shielding member which collectively covers the two high voltage circuit 17 (a shielding member as a measure against electromagnetic wave), and a well-known web that is formed by weaving a plurality of strands into a pipe shape is adopted. The shielding member 18 is formed to have a length that is almost the same as the full length of the two high voltage circuits 17. One end of the shielding member 18 is connected to the shielding case (not shown) or the like of the inverter unit 4 (refer to FIG. 1) through the above shielded connector (not shown).

The shielding member 18 may adopt, for example, a metal foil that has conductivity or a member that has the metal foil as long as measures against electromagnetic wave are possible.

The sheath 19 is formed by extruding resin having insulative property to the outside of the shielding member 18 by a predetermined thickness, and is placed at the outmost layer of the high voltage electrical pathway 15.

Besides the high voltage electrical pathway 15, an example includes a well-known shielded electric wire. There are one or a plurality of the shielded electric wires. Further, an example includes a high voltage coaxial composite electrical pathway (not shown) which is so constructed that one high voltage coaxial composite electrical pathway has a positive circuit and a negative circuit coaxially or one high voltage coaxial composite electrical pathway has three or more circuits coaxially.

In FIGS. 2 and 3, the exterior member 16 is a pipe body made of resin which covers the high voltage electrical pathway 15, and is formed into a shape to have an inner diameter necessary for the insertion of the high voltage electrical pathway 15, a length necessary to accommodate the high voltage electrical pathway 15, and a thickness necessary to protect the high voltage electrical pathway 15. The exterior member 16 can be formed into such a shape that there are no slits from an outer surface 22 to an inner surface 23 of the exterior member 16. The exterior member 16 is formed into such a shape that the high voltage electrical pathway 15 can be kept away from water (waterproofed), and is formed into a long shape. The exterior member 16 is provided at least at the middle part 10 of the wire harness 9, and is located below the vehicle floor 11 (refer to FIG. 1) when the wire harness 9 is wired in the vehicle. Therefore, the exterior member 16 is formed to have a length to extend across the vehicle floor 11 (refer to FIG. 1), in other words, a length equal to or more than a course binding the two through holes which the vehicle floor 11 is provided with and through which the wire harness penetrates. The exterior member 16 is not limited a product made of resin, but may be made of metal.

The exterior member 16 is formed to have a substantially rectangular cross section in the embodiment (The cross section shape is just an example. A round shape, an oval shape or an elliptical shape is also possible. Of course, a flat shape is more effective than a circular shape in height reduction). The exterior member 16 has a plurality of flexible pipe parts 24 which have flexibility and a plurality of unflexible pipe parts 25 (straight parts) which do not have the degree of flexibility that the flexible pipe parts 24 have, in other words, have a rigidity that is higher than that of the flexible pipe parts 24, and is formed into the shape shown in the figure.

The flexible pipe parts 24 and the unflexible pipe parts 25 are integrally molded of resin so that while the flexible pipe parts 24 are not flexed, the whole of the flexible pipe parts 24 and the unflexible pipe parts 25 becomes a straight shape. The flexible pipe parts 24 and the unflexible pipe parts 25 are arranged to alternate in the pipe axial direction (longitudinal direction).

The flexible pipe parts 24 are arranged at positions in accordance with a vehicle attaching shape (the shape of the destination where the wire harness is wired. The shape of the fixing target). The flexible pipe parts 24 can be formed to have lengths in accordance with the shape of the vehicle where the wire harness 9 is attached (hereinafter referred to as vehicle attaching shape).

By making the lengths of the flexible pipe parts 24 vary in the pipe axial direction, the flexible pipe parts 24 can be flexed by necessary lengths in accordance with the vehicle attaching shape. The flexible pipe parts 24 can be flexed at desired angles, respectively (not shown), when the wire harness 9 is packed or transported and the wire harness 9 is wired along courses to the vehicle after the wire harness 9 is manufactured.

The flexible pipe parts 24 can be flexed into bent shapes, and of course, the flexible pipe parts 24 can return to the original straight shape.

The flexible pipe parts 24 are formed into a bellows pipe shape in the embodiment (if the flexibility is provided, the shape is not particularly limited). Specifically, the flexible pipe parts 24 are formed to have circumferential recesses 26 and ridges 27, which alternate in the pipe axial direction.

As can be found from the above description, the flexible pipe parts 24 are arranged to form a corrugated tube shape. That is, the exterior member 16 is formed into such a shape that corrugated tubes exist partially. Because the exterior member 16 partially has the bellows pipe shape that is the characteristic structure of the corrugated tube as described above, the exterior member 16 may be referred to as a "corrugated tube" or a "partially corrugated tube".

The exterior member 16 is formed into such a shape that slits are not provided along the pipe axial direction (in other words, cuts are not provided to cut the exterior member 16 along the pipe axial direction). A reason that the slits are not provided is to improve waterproofness by preventing water from invading into the exterior member 16. Another reason is that the high voltage electrical pathway 15 would not protrude, for example, from the flexed parts. Besides, a further reason is to improve the rigidity of the exterior member 16 itself.

The exterior member 16 may be formed into such a shape that the exterior member 15 can be divided at predetermined positions in the pipe axial direction if the above points can be satisfied. In this case, the exterior member 16 is unified by bonding or welding or by appended members for connecting.

The unflexible pipe parts 25 are formed as unbent parts that will not be bent when the wire harness 9 is packed or transported and is wired along courses (the unbent parts means that the parts do not keep flexibility positively). The unflexible pipe parts 25 are formed into a straight tube shape of a substantially rectangular cross section (The cross section shape is just an example. A round shape, an oval shape or an elliptical shape is also possible. Of course, a flat shape is more effective than a circular shape in height reduction). The unflexible pipe parts 25 is formed to have lengths and at positions in accordance with the vehicle attaching shape. Because the unflexible pipe parts 25 are formed into a straight tube shape (direct pipe shape) as described above, the unflexible pipe parts 25 may be referred to as "straight parts" or "direct pipe parts".

The unflexible pipe part 25 of the substantially rectangular cross section has a pair of long side walls 28 and a pair of short side walls 29. The pair of long side walls 28 is formed to extend horizontally when viewed at a cross section state in the figure. On the other hand, the pair of short side walls 29 is formed to extend vertically in a slightly curved state. If the unflexible pipe part 25 has such a cross section, it can be said that an external force from the vertical direction, and an external force from the vertical direction can be resisted.

In FIGS. 3 and 4, the inner surface 23 of the unflexible pipe part 25 is formed with a plurality of recesses 30 that are recessed from the inner surface 23. At positions corresponding to the recesses 30 on the outer surface 22 of the unflexible pipe part 25, a plurality of ridges 31 that project are formed with the formation of the recesses 30. The recesses 30 are formed as circular recesses that extend circumferentially. The recesses 30 are formed as recesses of a predetermined depth. In the present embodiment, the recesses 30 are formed as shallow recesses.

The recesses 30 are formed to become contactless with the high voltage electrical pathway 15 while the high voltage electrical pathway 15 is inserted through the exterior member 16 (refer to FIG. 4). In other words, the recesses 30 are formed into such a shape that the bottoms (bottom surfaces) of the cavities of the recesses 30 will not contact the high voltage electrical pathway 15. The recesses 30 that extend circumferentially have such a shape to cross the high voltage electrical pathway 15 which is inserted through the unflexible pipe part 25 (in other words, when the inside of the unflexible pipe part 25 is viewed from top, the recesses 30 and the high voltage electrical pathway 15 intersect). Furthermore, the recesses 30 are formed to have such a width and depth that the distal end portion of the high voltage electrical pathway 15, which is being inserted through the unflexible pipe part 25, will not fall into and get caught in the recesses 30. In preventing the distal end portion from being caught, it is effective that the edges of the recesses 30 (the inner edges of the openings defined by the recesses 30) are formed with curved surfaces 32 (or tapers). The above recesses 30 are arranged to be spaced by predetermined intervals in the pipe axial direction.

When the high voltage electrical pathway 15 is inserted through the unflexible pipe part 25, the sliding of the high voltage electrical pathway 15 on the inner surface 23 of the unflexible pipe part 25 is interrupted by the recesses 30, and the sliding area of the high voltage electrical pathway 15 is reduced. As a result, the sliding frictional resistance that acts on the high voltage electrical pathway 15 when the high voltage electrical pathway 15 is inserted through the unflexible pipe part 25 can be reduced.

In the plurality of unflexible pipe parts 25, that attached below the vehicle floor 11 (refer to FIG. 1) is formed longer than those attached above the vehicle floor 11. The unflexible pipe part 25 which is formed longer is attached, for example, along a reinforcement.

The wire harness 9 of the above constitution and structure is manufactured as follows (illustration is omitted). That is, the wire harness 9 is manufactured by inserting the high voltage electrical pathway 15 through the exterior member 16, which is resin molded into a substantially straight shape as a whole, from one end to the other end. Further, the wire harness 9 is manufactured by attaching clamps, grommets or boots to predetermined positions on the outer surface of the exterior member 16. Furthermore, the wire harness 9 is manufactured by providing the shielded connectors to the terminal end portions of the high voltage electrical pathway 15.

In manufacturing the wire harness 9, when the high voltage electrical pathway 15 is inserted through the exterior member 16 from one end to the other end, the high voltage electrical pathway 15 is inserted smoothly. This is because the sliding frictional resistance that acts on the high voltage electrical pathway 15 is reduced by the recesses 30.

After manufactured as described above, the wire harness 9 becomes in a predetermined packed state when bending is performed so that the predetermined flexible pipe parts 24 are folded (at this time, the wire harness 9 becomes compact).

As described above with reference to FIGS. 1 to 4, the wire harness 9 according to the present invention includes the exterior member 16 in which a plurality of recesses 30 are formed on the inner surfaces 23 of the unflexible pipe parts 25. Thereby, when the high voltage electrical pathway 15 is inserted through the exterior member 16 from one end to the other end, the sliding of the high voltage electrical pathway 15 on the inner surfaces 23 can be interrupted by the recesses 30. Therefore, the sliding frictional resistance that acts on the high voltage electrical pathway 15 can be reduced, and thus the high voltage electrical pathway 15 can be inserted through the exterior member 16 smoothly (in other words, the high voltage electrical pathway 15 can be inserted smoothly even though the exterior member 16 is long). The present invention can improve the operatively concerning the manufacture of the wire harness.

To reduce the sliding frictional resistance, for example, a wire harness 9' as shown in FIGS. 5 and 6 may be provided. The wire harness 9' is described as follows.

The wire harness 9' includes the same high voltage electrical pathway 15 (electrical pathway) as above, and an exterior member 16' which accommodates and protects the high voltage electrical pathway 15.

The exterior member 16' has a plurality of flexible pipe parts 24 which have flexibility and a plurality of unflexible pipe parts 25' (straight parts) which do not have the degree of flexibility that the flexible pipe parts 24 have, and is formed into, for example, the shape shown in the figure. The inner surface 23 of the unflexible pipe part 25' is formed with a plurality of recesses 33 besides the circumferential recesses 30. The recesses 33 are formed as recesses that extend in the pipe axial direction. Reference signs 34 indicate ridges that occur with the formation of the recesses 33.

By adding the recesses 33, the sliding area of the high voltage electrical pathway 15 is reduced, and of course, the sliding frictional resistance that acts on the high voltage electrical pathway 15 can be further reduced. Besides, other recesses may include, for example, recesses that extend in the spiral direction or recesses of a dimple shape.

The recesses 33 and the ridges 31 are effective as parts that improve the rigidity of the unflexible pipe part 25'.

Further, the recesses 33 and the ridges 31 are effective as parts to make, for example, mounting positions, where parts to be attached later such as clamps are attached, recognized.

The wire harness 9' shown in FIGS. 5 and 6 has both the recesses 30 and the recesses 33, but even if the wire harness 9' only has the recesses 33, an effect is achieved that the sliding frictional resistance that acts on the high voltage electrical pathway 15 can be reduced.

It is apparent that various modifications can be made to the invention without changing the purpose of the invention.

The features of the embodiments of the wire harness according to the present invention described above are briefly, collectively listed in the following [1] to [3], respectively.

[1] A wire harness (9, 9') comprising a pipe-like exterior member (16), and one or a plurality of electrical pathways (high voltage electrical pathway 15) which are inserted through the exterior member, wherein the exterior member has a straight part (unflexible pipe part 25), and the inner surface of the straight part is formed with recesses (30, 33) which become contactless with the electrical pathways when the electrical pathways are inserted.

[2] The wire harness according to the above [1], wherein curved surfaces or tapers are formed at edges of the recesses.

[3] The wire harness according to the above [1] or [2], wherein the electrical pathways are formed to have a length to pass though the vehicle floor (11) and extend across the vehicle floor, and the exterior member is also formed to have a length to pass though the vehicle floor and extend across the vehicle floor.

Although the invention is described in detail with reference to the specific embodiment, it is apparent that various modifications and amendments may be made by those skilled in the art without departing from the spirit and scope of the invention.

According to the wire harness of the present invention, an effect is achieved that the operatively when electrical pathways are inserted through an exterior member can be improved. The present invention that achieves this effect is useful in a wire harness that includes a pipe-like exterior member, and one or a plurality of electrical pathways that are inserted through the exterior member.

REFERENCE SIGNS LIST 1 hybrid vehicle
2 engine
3 motor unit
4 inverter unit
5 battery
6 engine room
7 vehicle back part
8, 9 wire harness
10 middle part
11 vehicle floor
12 junction block
13 back end
14 front end
15 high voltage electrical pathway (electrical pathway)
16 exterior member
17 high voltage circuit
18 shielding member
19 sheath
20 conductor
21 insulator
22 outer surface
23 inner surface 24 flexible pipe part
25 unflexible pipe part (straight part)
26 furrow
27 ridge
28 long side wall
29 short side wall
30 furrow
31 ridge
32 curved surface
33 furrow

What is claimed is:

1. A wire harness comprising:
an electrical pathway;
a pipe like exterior member that covers the electrical pathway,
wherein the exterior member includes a low rigidity portion which is flexible and a high rigidity portion which is unflexible and has a rigidity higher than the low rigidity portion,
the low rigidity portion and the high rigidity portion are successively arranged in an extending direction of the electrical pathway,
the exterior member includes an inner surface that extends along the high rigidity portion,
the inner surface that extends along the high rigidity portion is interrupted by a plurality of recesses spaced along the inner surface, and
the electrical pathway spans each of the recesses without contacting a bottom of each of the recesses when the electrical pathway is inserted into the exterior member.

2. The wire harness according to claim 1,
wherein the high rigidity portion includes a straight part, and the recesses are located along a portion of the inner face of that extends along the straight part.

3. The wire harness according to claim 1, wherein curved surfaces or tapers are formed at edges of the recesses.

4. The wire harness according to claim 1, wherein the electrical pathway is formed to have a length to pass though a vehicle floor and extend across the vehicle floor, and
the exterior member is also formed to have a length to pass though the vehicle floor and extend across the vehicle floor.

5. The wire harness according to claim 1, wherein the electrical pathway and the exterior member are formed to have a length to pass through a vehicle floor and extend across the vehicle floor, and
the high rigidity portion is formed to fit a shape of an attached portion of the vehicle floor to which the exterior member is attached.

6. The wire harness according to claim 5, wherein the high rigidity portion includes a first wall which is configured to face the floor and a second wall which is configured to face the ground, and
the first wall and the second wall are parallel to each other.

7. The wire harness according to claim 6, wherein the high rigidity portion includes two support walls which support the first wall and the second wall and are symmetrically arranged.

8. The wire harness according to claim 7, wherein the two support walls are formed into a curved shape in which each of center portions of the two support walls are away from each other.

9. The wire harness according to claim 7, wherein each of the two walls includes a deform part with which outer faces of the two walls are deformable toward outside and inner faces of the two walls are deformable in accordance with the deformation of the outer faces toward outside.

10. The wire harness according to claim 1, wherein a first set of the plurality of recesses extend in the circumferential direction of the exterior member, and a second set of the plurality of recesses extend in an axial direction of the exterior member such that each one of the second set of the plurality of recesses intersects each one of the first set of the plurality of recesses.

11. The wire harness according to claim 1, wherein the exterior member includes an outer surface that extends along the high rigidity portion,
the outer surface is interrupted by a plurality of ridges spaced along the outer surface, and
each of the plurality of ridges is paired with a corresponding one of the plurality of recesses.

* * * * *